US009655025B1

(12) United States Patent
Vivanco

(10) Patent No.: US 9,655,025 B1
(45) Date of Patent: May 16, 2017

(54) MANAGING THE PERFORMANCE OF A WIRELESS DEVICE HANDOVER

(71) Applicant: Sprint Spectrum LP, Overland Park, KS (US)

(72) Inventor: Daniel Vivanco, Sterling, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 120 days.

(21) Appl. No.: 14/223,925

(22) Filed: Mar. 24, 2014

(51) Int. Cl.
*H04W 36/34* (2009.01)

(52) U.S. Cl.
CPC .................................. *H04W 36/34* (2013.01)

(58) Field of Classification Search
None
See application file for complete search history.

(56) References Cited

U.S. PATENT DOCUMENTS

| | | | | |
|---|---|---|---|---|
| 2007/0191013 A1* | 8/2007 | Gunnarsson | .......... | H04W 36/04 455/438 |
| 2008/0102834 A1* | 5/2008 | Bernhard | .............. | H04W 36/24 455/436 |
| 2008/0125127 A1* | 5/2008 | Hwang | ................. | H04W 36/36 455/436 |
| 2009/0156215 A1* | 6/2009 | Pitkamaki | ............. | H04W 36/14 455/437 |
| 2010/0173626 A1* | 7/2010 | Catovic | ................. | H04W 36/30 455/423 |
| 2011/0092209 A1* | 4/2011 | Gaal | ..................... | H04W 16/12 455/436 |
| 2011/0256864 A1* | 10/2011 | Fitzgerald | ............... | H04L 63/30 455/426.1 |
| 2012/0100857 A1* | 4/2012 | Belschner | ......... | H04W 36/0083 455/436 |
| 2012/0129562 A1* | 5/2012 | Stamoulis | ........... | H04W 76/023 455/517 |
| 2012/0315905 A1* | 12/2012 | Zhu | ........................ | H04W 36/36 455/436 |
| 2013/0095839 A1* | 4/2013 | Venkatraman | ........ | H04W 36/04 455/444 |
| 2013/0210422 A1 | 8/2013 | Pani et al. | | |
| 2013/0225178 A1* | 8/2013 | Kojima | ............... | H04W 36/245 455/437 |
| 2013/0303155 A1 | 11/2013 | Da Silva et al. | | |
| 2014/0045500 A1* | 2/2014 | Dimou | .............. | H04W 36/0083 455/436 |
| 2014/0106738 A1* | 4/2014 | Ostrup | .................. | H04W 24/02 455/422.1 |
| 2015/0011219 A1* | 1/2015 | Saily | ................. | H04W 36/0094 455/436 |
| 2015/0049617 A1* | 2/2015 | Yang | ..................... | H04W 24/08 370/252 |

(Continued)

*Primary Examiner* — Jeffrey M Rutkowski
*Assistant Examiner* — Andre Tacdiran

(57) ABSTRACT

It is identified that an attempted handover of a wireless device from a first access node to a second access node meets a failure criteria, where the attempted handover uses a handover initiation timer and a signal level modifier. A first signal level of the first access node, and a second signal level of the second access node, received at the wireless device at a time when the attempted handover was initiated are determined. At least one of the handover initiation timer and the signal level modifier is adjusted based on the failure criteria, the determined first signal level, and the determined second signal level.

16 Claims, 6 Drawing Sheets

(56) References Cited

U.S. PATENT DOCUMENTS

| | | | |
|---|---|---|---|
| 2015/0119036 A1* | 4/2015 | Yang | H04W 36/0094 455/436 |
| 2015/0141020 A1* | 5/2015 | Bengtsson | H04W 48/20 455/440 |
| 2015/0208308 A1* | 7/2015 | Watanabe | H04W 36/08 455/436 |
| 2015/0237516 A1* | 8/2015 | Michel | H04W 36/0094 370/252 |
| 2015/0245261 A1* | 8/2015 | Teyeb | H04W 36/0083 455/437 |
| 2015/0257147 A1* | 9/2015 | Ji | H04W 16/14 370/329 |
| 2016/0205601 A1* | 7/2016 | Yiu | H04W 28/0242 455/444 |
| 2016/0285679 A1* | 9/2016 | Dudda | H04W 24/02 |
| 2016/0381730 A1* | 12/2016 | Jain | H04W 76/048 370/311 |

* cited by examiner

MANAGING THE PERFORMANCE OF A WIRELESS DEVICE HANDOVER

TECHNICAL BACKGROUND

A heterogeneous network environment can include access nodes of various size, signal transmission power, coverage area, supported frequency bands, supported radio access technologies, and the like. The deployment of smaller access nodes, such as micro nodes, pico nodes, femto nodes, and so forth, enables rapid and cost-efficient network development at lower costs than the deployment of macro access nodes. Thus, deploying smaller access nodes can quickly extend the coverage and throughput of a communication network. Management of wireless device mobility among the various macro, micro, pico, femto, etc. nodes is of paramount importance in a wireless communication network.

OVERVIEW

In operation, a handover is attempted of a wireless device from a first access node to a second access node using, among other things, a handover initiation timer and a signal level modifier. It is identified that an attempted handover of a wireless device from a first access node to a second access node meets a failure criteria. Signal levels are determined of a first signal level of the first access node and a second signal level of the second access node received at the wireless device at the time when the attempted handover was initiated. Based on the failure criteria, the determined first signal level, and the determined second signal level, at least one of the handover initiation timer and the signal level modifier are adjusted.

DETAILED DESCRIPTION

Figure 1:
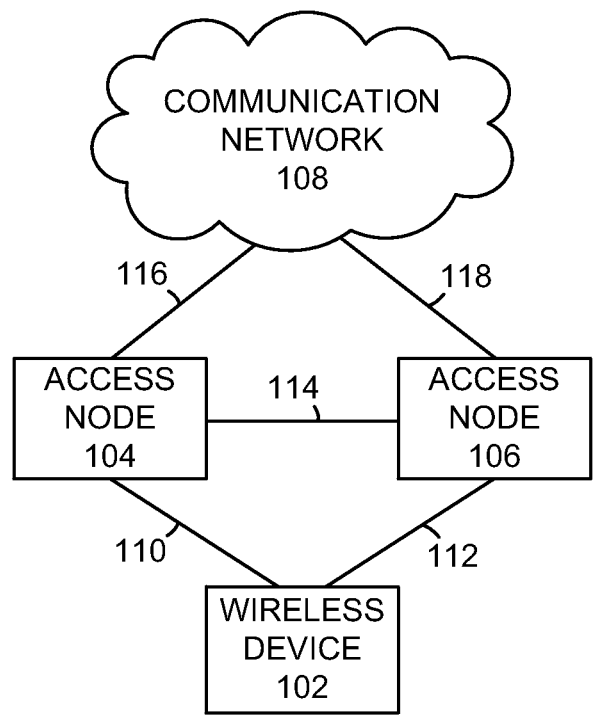
FIG. 1 illustrates an exemplary communication system to manage the performance of a wireless device handover.

FIG. 1 illustrates an exemplary communication system 100 to manage the performance of a wireless device handover comprising wireless device 102, access node 104, access node 106, and communication network 108. Examples of wireless device 102 can comprise a cell phone, a smart phone, a computing platform such as a laptop, palmtop, or tablet, a personal digital assistant, or an internet access device, including combinations thereof. Wireless device 102 can communicate with access node 104 over communication link 110, and with access node 106 over communication link 112.

Access nodes 104 and 106 are each a network node capable of providing wireless communications to wireless device 102, and can comprise, for example, a base transceiver station, a radio base station, an eNodeB device, or an enhanced eNodeB device. Access nodes 104 and 106 can also vary in coverage area size, signal transmission power, and the like, and each access node can comprise a macro node, a micro node, a pico node, a femto node, and so forth. Access nodes 104 and 106 can each comprise a coverage area in which a signal from an access node is detectable by a wireless device at or above a threshold signal level. For example, access node 104 may comprise a first coverage area, and access node 106 may comprise a second coverage area which partially or completely overlaps with the first coverage area. Access node 104 can communicate with communication network 108 over communication link 116, and access node 106 can communicate with communication network 108 over communication link 118. Access nodes 104 and access nodes 106 may also communicate with each other over communication link 114.

Communication network 108 can comprise a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 108 can be capable of carrying voice information and other data, for example, to support communications by a wireless device such as wireless device 102. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Worldwide Interoperability for Microwave Access (WiMAX), and Third Generation Partnership Project Long Term Evolution (3GPP LTE). Wired network protocols that may be utilized by communication network 108 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 108 may also comprise a wireless network, including base stations, wireless communication nodes, telephony switches, internet routers, network gateways, computer systems, communication links, or some other type of communication equipment, and combinations thereof.

Communication links 110, 112, 114, 116, and 118 can comprise wired or wireless communication links. Wired communication links can comprise, for example, twisted pair cable, coaxial cable or fiber optic cable, or combinations thereof. Wireless communication links can comprise a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in communication system 100 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication between access node 104, access node 106, and communication network 108 which are omitted for clarity, including additional processing nodes, routers, gateways, and physical and/or wireless data links for carrying data among the various network elements.

Management of wireless device mobility among the access nodes in a wireless communication system is of paramount importance. Typically, a wireless device is handed over from a first access node to a second access node when the second access node is determined to provide a signal strength greater than a signal strength of the first access node. However, in a heterogeneous network environment comprising various macro, micro, pico, femto, etc. nodes, management of wireless device mobility can be somewhat more complex. Where a smaller access node is deployed within a coverage area of a macro node, variations in conditions can affect the received signal levels of each of the access nodes by a wireless device. For example, a pico node may be deployed within a building, which is itself within the coverage area of a macro node. A wireless device moving within the building may detect varying signal levels from the pico node and the macro node owing to structural interference with one or more of the signals, the location of windows or doors, the proximity of the wireless device to the exterior of the building, and so forth. Such perceived variability in the signal levels may lead to an attempted handover from one access node to the other access node too early, or too late, or may cause rapid handovers (e.g., ping-ponging) of the wireless device between the macro and smaller access nodes.

In operation, a handover of wireless device 102 from access node 104 to access node 106 may be attempted, where the attempted handover uses, among other things, a handover initiation timer and a signal level modifier, and it may be identified that the attempted handover meets a failure criteria. The failure criteria can comprise, for example, loss of a communication link between the wireless device and the first access node before the successful completion of the handover. The failure criteria can also comprise, for example, a failure to establish a communication link between the wireless device and the second access node. The failure criteria can further comprise, for example, completing the attempted handover and performing a second handover of the wireless device from the second access node to the first access node within a predetermined period of time. A first and second signal level are determined which were received at the wireless device at a time when the attempted handover was initiated, where the first signal level comprises a signal level of first access node 104, and the second signal level comprises a signal level of second access node 106. Based on the failure criteria, the determined first signal level, and the determined second signal level, at least one of the handover initiation timer and the signal level modifier are adjusted.

Figure 2:
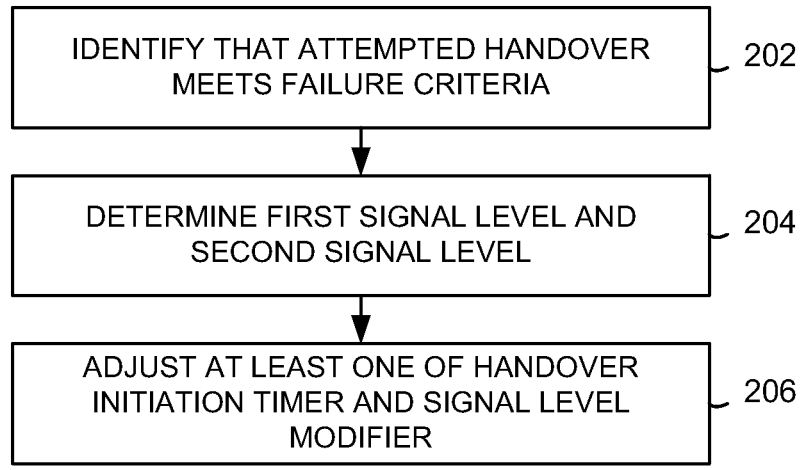
FIG. 2 illustrates an exemplary method of managing the performance of a wireless device handover.
Figure 3:
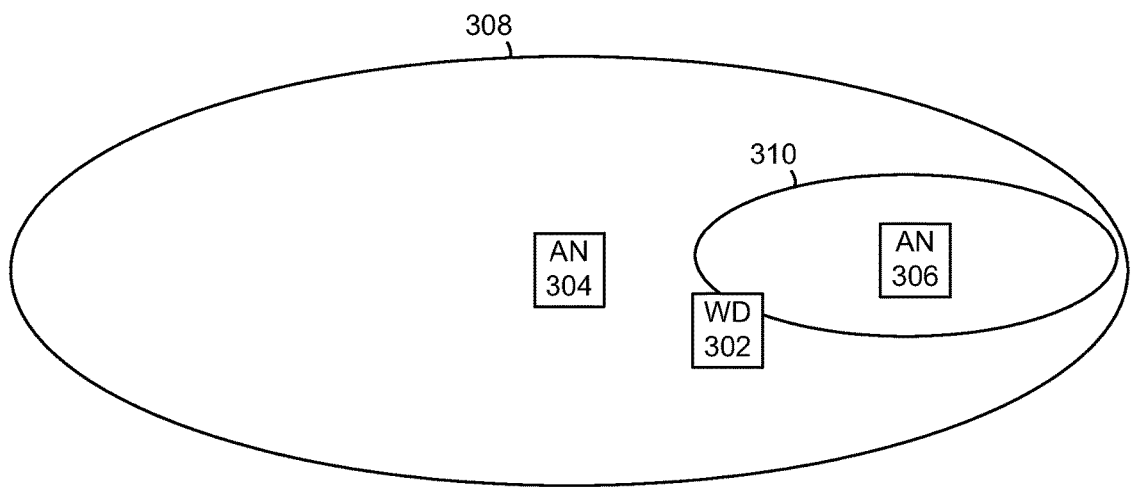
FIG. 3 illustrates another exemplary communication system to manage the performance of a wireless device handover.

FIG. 2 illustrates an exemplary method of managing the performance of a wireless device handover. It is identified that an attempted handover of a wireless device from a first access node to a second access node meets a failure criteria, wherein the attempted handover uses a handover initiation timer and a signal level modifier (operation 202). For example, referring to FIG. 3, wireless device 302 can be in communication with access node 304, and signal levels can be determined of a signal from access node 304 and a signal from access node 306 received at wireless device 302. Access node 304 can comprise a coverage area 308, and access node 306 can comprise a coverage area 310. A coverage area comprises a radius from an access node in which a signal from access node 304 can be detected by wireless device 302 at or above a threshold signal level. A signal can comprise, for example, a reference signal, a pilot signal, a bearer channel, a control channel, and the like. A signal level can comprise a reference signal receive power (RSRP), a received signal strength indication (RSSI), a signal-to-noise ratio (SNR), a carrier to noise ratio (CNR) value, a signal noise and distortion (SINAD), a signal to interference (SII), a signal to noise plus interference (SNIR), a signal to quantization noise ratio (SQNR), and the like. The signal level can also comprise a reference signal receive quality (RSRQ), a channel quality indicator (CQI), or another measurement of signal quality.

When the signal level of the second access node (access node 306) is greater than the signal level of the first access node (access node 304), a handover can be attempted of the wireless device to the second access node. The attempted handover may use a handover initiation timer and a signal level modifier. The handover initiation timer can comprise a period of time for which the second signal level must equal or exceed the first signal level. The signal level modifier can comprise an adjustment to the second signal level, for example, to prevent a handover from the first access node too early. For example, the signal level modifier can be applied so that the second signal level must exceed the first signal level by an amount greater than or equal to the signal level modifier. The signal level modifier can thus be added to the first signal level, subtracted from the signal level, and so forth. In an embodiment, a handover of the wireless device from the first access node to the second access node is attempted when the second signal level is equal to or greater than the first signal level by an amount greater than or equal to the signal level modifier for a duration of time equal to the handover initiation timer.

However, the handover may not be successful for one or more reasons. For example, wireless communication with the first access node can be prematurely lost if the handover is initiated too late (e.g., the first signal level has decreased to a point at which wireless communications cannot be sustained). Also, wireless communication with the second access node may not be established can be prematurely lost if the handover is initiated too early (e.g., the second signal level has not yet increased to a point at which wireless communications can be sustained). Further, the handover may be completed, yet a second handover of the wireless device may be performed from the second access node to the first access node within a predetermined period of time, because the signal levels of the first and second access nodes are varying relative to each other. Thus, the attempted handover of the wireless device may meet a failure criteria.

Returning to FIG. 2, a first signal level of the first access node and a second signal level of the second access node received at the wireless device at a time when the attempted handover was initiated are determined (operation 204). Each signal level can comprise a reference signal receive power (RSRP), a received signal strength indication (RSSI), a signal-to-noise ratio (SNR), a carrier to noise ratio (CNR) value, a signal noise and distortion (SINAD), a signal to interference (SII), a signal to noise plus interference (SNIR), a signal to quantization noise ratio (SQNR), and the like. The signal level can also comprise a reference signal receive quality (RSRQ), a channel quality indicator (CQI), or another measurement of signal quality.

Next, at least one of the handover initiation timer and the signal level modifier are adjusted based on the failure criteria, the determined first signal level, and the determined second signal level (operation 206). For example, one of the handover initiation timer and the signal level modifier can be increased, or decreased, based on determined conditions associated with the failed handover attempt, including the failure criteria, the determined first signal level, and the determined second signal level.

Figure 4:
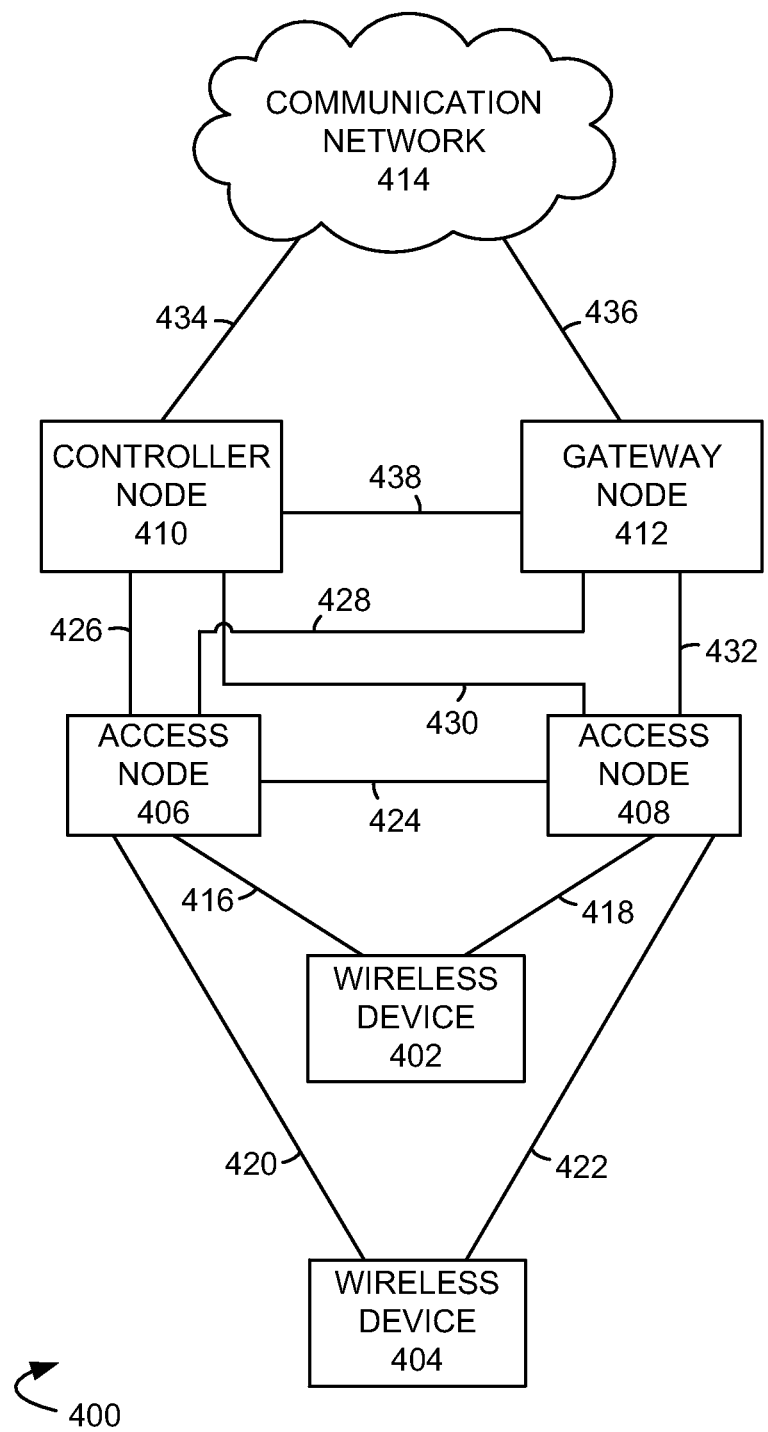
FIG. 4 illustrates another exemplary communication system to manage the performance of a wireless device handover.

FIG. 4 illustrates another exemplary communication system 400 to manage the performance of a wireless device handover comprising wireless device 402, wireless device 404, access node 406, access node 408, controller node 410, gateway node 412, and communication network 414. Examples of wireless devices 402 and 404 can comprise a cell phone, a smart phone, a computing platform such as a laptop, palmtop, or tablet, a personal digital assistant, or an internet access device, including combinations thereof. Wireless device 402 can communicate with access node 406 over communication link 416, and with access node 408 over communication link 418. Wireless device 404 can communicate with access node 406 over communication link 420, and with access node 408 over communication link 422.

Access nodes 406 and 408 are each is a network node capable of providing wireless communications to wireless devices 402 and 404, and can comprise, for example, a base transceiver station, a radio base station, an eNodeB device, or an enhanced eNodeB device. Access nodes 406 and 408 can comprise a larger access node, such as a macro node, or they can comprise a smaller access node, such as a micro node, a pico node, a femto node, and the like. Varying size access nodes can be characterized by available transmission power, frequency bands supported, coverage areas of the frequency bands, and number of simultaneous connections supported, among other things. A first access node (e.g., access node 406) can comprise a first coverage area, and a second access node (e.g., access node 408) can comprise a second coverage area, at least a portion of which overlaps the first coverage area. Access node 406 is in communication with controller node 410 over communication link 426 and with gateway node 412 over communication link 428. Access node 412 is in communication with controller node 410 over communication link 430 and with gateway node 412 over communication link 432. Access nodes 304 and 306 can also communicate with each other over communication link 424.

Controller node 410 can comprise a processor and associated circuitry to execute or direct the execution of computer-readable instructions, and can be configured to control the setup and maintenance of a communication session over communication network 414 for wireless devices 402 and 404, as well as to manage the performance of a wireless device handover. Controller node 410 can comprise a mobile switching center (MSC), a dispatch call controller (DCC), a mobility management entity (MME), or another similar network node. Controller node 410 can retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Controller node 410 can receive instructions and other input at a user interface. Controller node 410 is in communication with communication network 414 over communication link 434, and with gateway node 412 over communication link 438.

Gateway node 412 can comprise a processor and associated circuitry to execute or direct the execution of computer-readable instructions, and can be configured to manage the performance of a wireless device handover. Gateway node 412 can retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 412 can receive instructions and other input at a user interface. Examples of gateway node 412 can include a standalone computing device, a computer system, or a network component, such as an access service network gateway (ASN-GW), a packet data network gateway (P-GW), a serving gateway (S-GW), a mobile switching controller (MSC), a packet data serving node (PDSN), call processing equipment, a home agent, a radio node controller (RNC), a subscriber profile system (SPS), authentication, authorization, and accounting (AAA) equipment, and a network gateway, including combinations thereof. Gateway node 412 is in communication network 414 over communication link 436.

Communication network 414 can comprise a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 414 can be capable of carrying voice information and other data, for example, to support communications by a wireless device such as wireless devices 402 and 404. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Worldwide Interoperability for Microwave Access (WiMAX), and Third Generation Partnership Project Long Term Evolution (3GPP LTE). Wired network protocols that may be utilized by communication network 414 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 414 may also comprise a wireless network, including base stations, wireless communication nodes, telephony switches, internet routers, network gateways, computer systems, communication links, or some other type of communication equipment, and combinations thereof.

Communication links 416, 418, 420, 422, 424, 426, 428, 430, 432, 434, 436 and 438 can comprise wired or wireless communication links. Wired communication links can comprise, for example, twisted pair cable, coaxial cable or fiber optic cable, or combinations thereof. Wireless communication links can comprise a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in communication system 400 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication between access nodes 406 and 408, controller node 410, gateway node 412, and communication network 414 which are omitted for clarity, including additional processing nodes, routers, gateways, and physical and/or wireless data links for carrying data among the various network elements.

Figure 5:
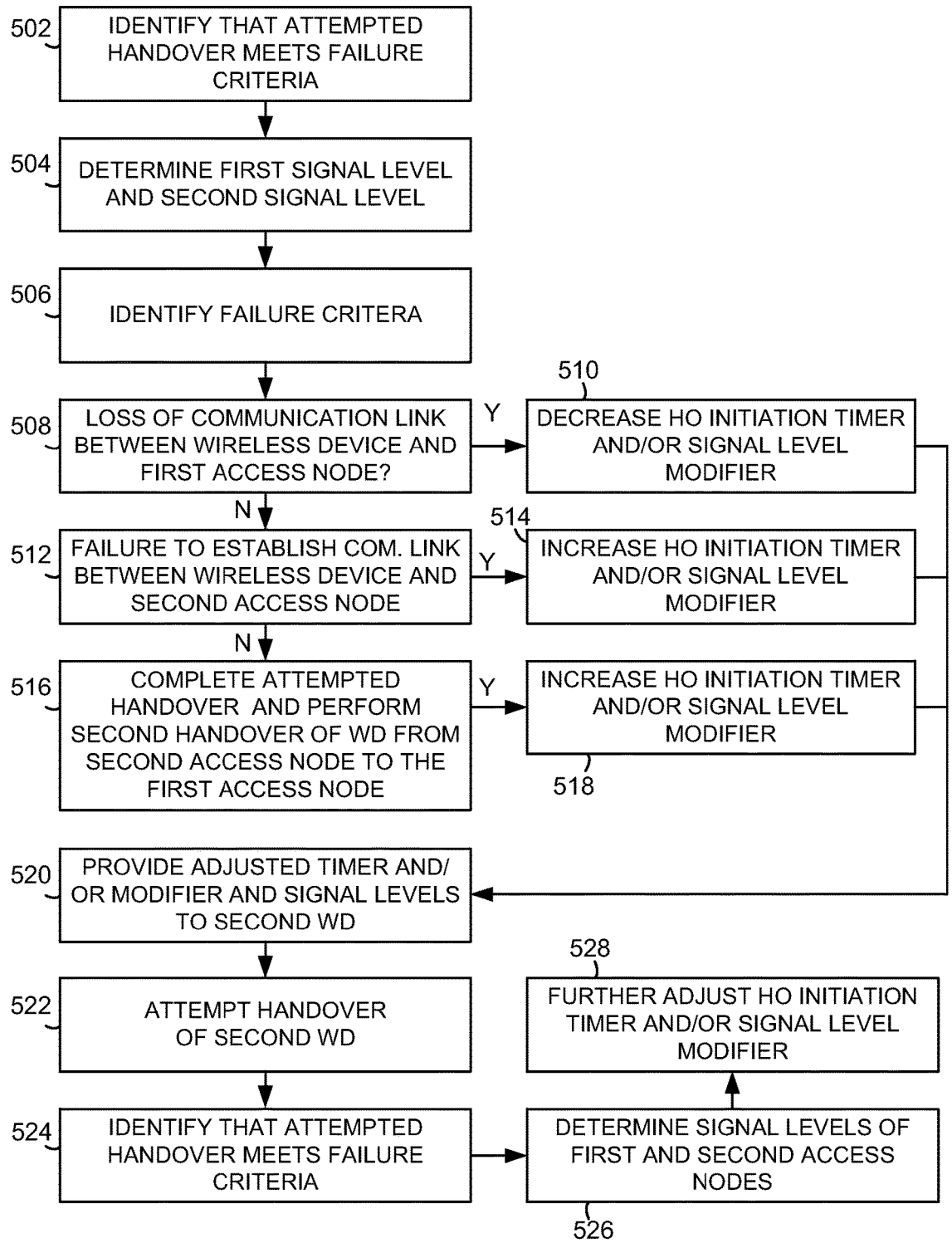
FIG. 5 illustrates another exemplary method of managing the performance of a wireless device handover.

FIG. 5 illustrates another exemplary method of managing the performance of a wireless device handover. It is identified that an attempted handover of a wireless device from a first access node to a second access node meets a failure criteria, wherein the attempted handover uses a handover initiation timer and a signal level modifier (operation 502). For example, wireless device 402 can be in communication with access node 404, and signal levels can be determined of a signal from access node 406 and a signal from access node 408 received at wireless device 402. A signal can comprise, for example, a reference signal, a pilot signal, a bearer channel, a control channel, and the like. A signal level can comprise a reference signal receive power (RSRP), a received signal strength indication (RSSI), a signal-to-noise ratio (SNR), a carrier to noise ratio (CNR) value, a signal noise and distortion (SINAD), a signal to interference (SII), a signal to noise plus interference (SNIR), a signal to quantization noise ratio (SQNR), and the like. The signal level can also comprise a reference signal receive quality (RSRQ), a channel quality indicator (CQI), or another measurement of signal quality.

When the signal level of the second access node is greater than the signal level of the first access node, a handover can be attempted of wireless device 402 to second access node 406. The attempted handover may use a handover initiation timer and a signal level modifier. The handover initiation timer can comprise a period of time for which the second signal level must equal or exceed the first signal level. The signal level modifier can comprise an adjustment to the second signal level, for example, to prevent a handover from the first access node too early. For example, the signal level modifier can be applied so that the second signal level must exceed the first signal level by an amount greater than or equal to the signal level modifier. The signal level modifier can thus be added to the first signal level, subtracted from the signal level, and so forth. In an embodiment, a handover of the wireless device from the first access node to the second access node is attempted when the second signal level is equal to or greater than the first signal level by an amount greater than or equal to the signal level modifier for a duration of time equal to the handover initiation timer.

However, the attempted handover of the wireless device may meet a failure criteria. In such case, a first signal level of the first access node and a second signal level of the second access node received at the wireless device at a time when the attempted handover was initiated are determined (operation 504). Each signal level can comprise a reference signal receive power (RSRP), a received signal strength indication (RSSI), a signal-to-noise ratio (SNR), a carrier to noise ratio (CNR) value, a signal noise and distortion (SINAD), a signal to interference (SII), a signal to noise plus interference (SNIR), a signal to quantization noise ratio (SQNR), and the like. The signal level can also comprise a reference signal receive quality (RSRQ), a channel quality indicator (CQI), or another measurement of signal quality.

Then, the failure criteria is identified (operation 506). For example, wireless communication with the first access node can be prematurely lost if the handover is initiated too late (e.g., the first signal level has decreased to a point at which wireless communications cannot be sustained). Also, wireless communication with the second access node may not be established can be prematurely lost if the handover is initiated too early (e.g., the second signal level has not yet increased to a point at which wireless communications can be sustained). Further, the handover may be completed, yet a second handover of the wireless device may be performed from the second access node to the first access node within a predetermined period of time, because the signal levels of the first and second access nodes are varying relative to each other.

When it is determined that wireless communication with the first access node was lost because the handover was initiated too late (operation 508), at least one of the handover initiation timer and the signal level modifier are decreased (operation 510). For example, when the first signal level decreases to a level at which wireless communications with the wireless device cannot be sustained before the attempted handover is completed, at least one of the handover initiation timer and the signal level modifier can be decreased. When it is determined that the attempted handover failed because the second signal level has not yet increased to a level at which communications with the wireless device can be established (operation 512), at least one of the handover initiation timer and the signal level modifier are increased (operation 514). Further, when it is determined that the handover was successfully completed, and a second handover of the wireless device is then performed from the second access node to the first access node within a predetermined period of time (operation 516), at least one of the handover initiation timer and the signal level modifier are increased (operation 518).

At least one of the adjusted handover initiation timer and/or adjusted signal level modifier are then provided to a second wireless device (operation 520). The first and second signal levels may also be provided to the second wireless device. Subsequently, signal levels of the first and second access nodes received at the second wireless device are received. Based on the adjusted handover initiation timer and/or the adjusted signal level modifier and the signal levels of the first and second access nodes received at the second wireless device, a handover of the second wireless device may be attempted from the first access node to the second access node (operation 522). Using the adjusted handover initiation timer and/or the adjusted signal level modifier and the signal levels of the first and second access nodes received at the second wireless device may enable the performance of a successful handover of the second wireless device from the first access node to the second access node. However, in some cases, an attempted handover of the second wireless device may fail.

In operation 524, it is identified that the attempted handover of the second wireless device meets a second failure criteria. The failure criteria may be analogous to the criteria identified in operations 508, 512, and 516. Additionally, signal levels of the first and second access nodes received at the second wireless device at a time when the attempted handover of the second wireless device was initiated are determined (operation 526).

Based on the failure criteria associated with the second wireless device and the signal levels of the first and second access nodes received at the second wireless device at the time when the attempted handover of the second wireless device was initiated, at least one of the handover initiation timer and the signal level modifier are further adjusted (operation 528). For example, at least one of the handover initiation timer and the signal level modifier can be decreased when it is determined that wireless communication with the first access node was lost because the signal level of the first access node had decreased to a level at which wireless communications with the wireless device cannot be sustained before the attempted handover was completed. Further, at least one of the handover initiation timer and the signal level modifier cane increased when it is determined that the attempted handover failed because the second signal level had not yet increased to a level at which communications with the wireless device could be established. Moreover, at least one of the handover initiation timer and the signal level modifier are increased when it is determined that the handover was successfully completed, and a second handover of the second wireless device was then performed from the second access node to the first access node within a predetermined period of time.

A plurality of signal levels of the first and second signal levels, and associated handover failure criteria, can be determined from a plurality of wireless devices over time. Further, the signal levels and failure criteria can be stored at a network element, such as access node 406 or 408, controller node 410, gateway node 412, or another network element. The plurality of signal levels and the associated failure criteria can then be provided to a new wireless device in a coverage area of access node 406 or 408. Further, the stored signal levels and failure criteria can be supplemented with additional information (signal levels and failure criteria) from later wireless devices. The plurality of signal levels of the first and second signal levels and associated handover failure criteria can thus be updated on an ongoing basis, whether periodically, or upon instruction from, e.g., controller node 410, or at some other time.

The plurality of signal levels of the first and second signal levels and associated handover failure criteria can be updated until failed handover attempts from the first access node to the second access node meet a threshold failure level. As one example, when failed handover attempts from the first access node to the second access node meet a threshold failure level meets a threshold level of less than or equal to 0.5% of attempted handovers, adjustment of the handover initiation timer and/or the signal level modifier may be suspended. Further, the plurality of signal levels of the first and second signal levels and associated handover failure criteria associated with one access node, or with a pair of access nodes (e.g., access nodes 406 and 408), may be provided to neighbor access nodes of access node 406 and/or access node 408 (not illustrated), to assist the neighbor access nodes in determining appropriate adjusted values of a handover initial timer and/or signal level modifier. The handover initial timer and signal level modifier can be determined for each access node in a communication system, or they can be determined for a pair of access nodes in a communication system. Further, for a pair of access nodes, a first handover initial timer and signal level modifier can be determined for handovers from the first access node to the second access node, and a second handover initial timer and signal level modifier can be determined for handovers from the second access node to the first access node.

Figure 6:
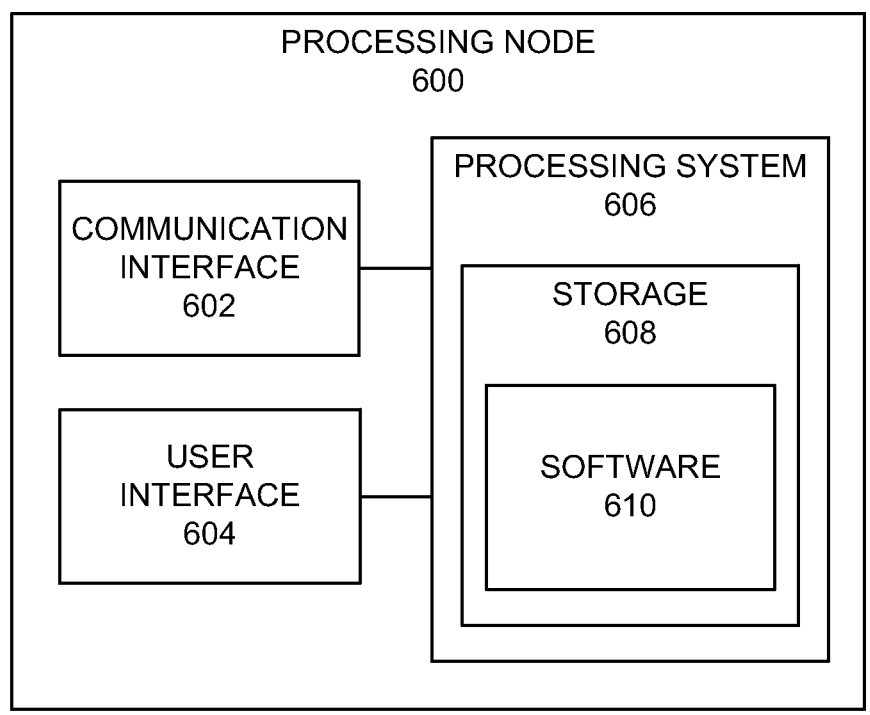
FIG. 6 illustrates an exemplary processing node.

FIG. 6 illustrates an exemplary processing node 600 in a communication system. Processing node 600 comprises communication interface 602, user interface 604, and processing system 606 in communication with communication interface 602 and user interface 604. Processing node 600 can be configured to manage the performance of a wireless device handover. Processing system 606 includes storage 608, which can comprise a disk drive, flash drive, memory circuitry, or other memory device. Storage 608 can store software 610 which is used in the operation of the processing node 600. Storage 608 may include a disk drive, flash drive, data storage circuitry, or some other memory apparatus. Software 610 may include computer programs, firmware, or some other form of machine-readable instructions, including an operating system, utilities, drivers, network interfaces, applications, or some other type of software. Processing system 606 may include a microprocessor and other circuitry to retrieve and execute software 610 from storage 608. Processing node 600 may further include other components such as a power management unit, a control interface unit, etc., which are omitted for clarity. Communication interface 602 permits processing node 600 to communicate with other network elements. User interface 604 permits the configuration and control of the operation of processing node 600.

Examples of processing node 600 include access nodes 104 and 106, access nodes 306 and 308, controller node 410, and gateway node 412. Processing node 600 can also be an adjunct or component of a network element, such as an element of one or more of the foregoing network elements. Processing node 600 can also be another network element in a communication system. Further, the functionality of processing node 600 can be distributed over two or more network elements of a communication system, including any of the foregoing.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention, and that various modifications may be made to the configuration and methodology of the exemplary embodiments disclosed herein without departing from the scope of the present teachings. Those skilled in the art also will appreciate that various features disclosed with respect to one exemplary embodiment herein may be used in combination with other exemplary embodiments with appropriate modifications, even if such combinations are not explicitly disclosed herein. As a result, the invention is not limited to the specific embodiments described above, but only by the following claims and their equivalents.

What is claimed is:

1. A method of managing the performance of a wireless device handover in a heterogeneous network having a macro access node with a first coverage area and a small access node with a second coverage area within the first coverage area, said method comprising:
   monitoring a first signal level of the macro access node and a second signal level of the small access node;
   attempting a handover from the macro access node to the small access node when the second signal is greater than the first signal, or from the small access node to the macro access node when the first signal is greater than the second signal;
   identifying that the attempted handover of a wireless device meets a failure criteria,
   wherein the failure criteria comprises one or more of
      losing a communication link with the macro access node right before the attempted handover is completed because of a decrease in the first signal level,
      losing a communication link with the small access node right after the attempted handover is completed because of a decrease in the second signal level, or
      a frequent occurrence of multiple handovers between the macro access node and the small access node caused by the first signal level and the second signal level varying relative to each other;
   determining the first signal level of the macro access node and the second signal level of the small access node received at the wireless device at a time when the attempted handover was initiated;
   for handovers from the macro access node to the small access node, adjusting of a first handover initiation timer and a first signal level modifier based on the failure criteria, the determined first signal level, and the determined second signal level;
   wherein the first signal level modifier adjusts a value of the first signal level of the macro access node
   for handovers from the small access node to the macro access node, adjusting a second handover initiation timer and a second signal level modifier based on the failure criteria, the determined first signal level, and the determined second signal level;
   wherein the second signal level modifier adjusts a value of the second signal level of the small access node
   performing one or more additional handovers using
      the adjusted first handover initiation timer and the adjusted first signal level modifier when the one or more additional handovers are from the macro access node to the small access node, or
      the adjusted second handover initiation timer and the adjusted second signal level modifier when the one or more additional handovers are from the small access node to the macro access node; and
   upon determining that a threshold failure level is met, suspending the adjusting of the first and second handover initiation timer and the first and second signal level modifier.

2. The method of claim 1, further comprising decreasing the first handover initiation timer when the failure criteria comprises loss of a communication link between the wireless device and the macro access node.

3. The method of claim 1, further comprising decreasing the first signal level modifier when the failure criteria comprises loss of a communication link between the wireless device and the macro access node.

4. The method of claim 1, further comprising increasing the first handover initiation timer when the failure criteria comprises a failure to establish a communication link between the wireless device and the small access node.

5. The method of claim 1, further comprising increasing the first signal level modifier when the failure criteria comprises a failure to establish a communication link between the wireless device and the small access node.

6. The method of claim 1, further comprising increasing the first handover initiation timer when the failure criteria comprises completing the attempted handover and performing the second handover of the wireless device from the small access node to the macro access node within a predetermined period of time.

7. The method of claim 1, further comprising increasing the first signal level modifier when the failure criteria comprises completing the attempted handover and performing the second handover of the wireless device from the small access node to the macro access node within a predetermined period of time.

8. The method of claim 1, further comprising:
   providing the adjusted first or second handover initiation timer and the first or second signal level modifier to a second wireless device; and
   performing the second handover of the second wireless device from the macro access node to the small access node using the adjusted first or second handover initiation timer and the first or second signal level modifier.

9. The method of claim 1, further comprising:
   providing the adjusted first or second handover initiation timer and the first or second signal level modifier to a second wireless device;
   detecting at the second wireless device a third signal level from the macro access node and a fourth signal level from the small access node;
   attempting to perform the second handover of the second wireless device from the macro access node to the small access node based on the adjusted first handover initiation timer and the first signal level modifier by the second wireless device.

10. The method of claim 9, further comprising:
    identifying that the second handover of the second wireless device meets a second failure criteria; and
    adjusting further the adjusted first handover initiation timer and the first signal level modifier based on the second failure criteria, the detected third signal level, and the detected fourth signal level.

11. A system of managing the performance of a wireless device handover, comprising:
    a processing node, configured
    to identify that an attempted handover of a wireless device meets a failure criteria,
    wherein the failure criteria comprises one or more of
       losing a communication link with the macro access node right before the attempted handover is completed because of a decrease in a first signal level of the macro access node,
       losing a communication link with the small access node right after the attempted handover is completed because of a decrease in a second signal level of the small access node, or
       a frequent occurrence multiple handovers between the macro access node and the small access node caused by the first signal level and the second signal level varying relative to each other;
    determine the first signal level of the macro access node and the second signal level of the small access node received at the wireless device at a time when the attempted handover was initiated;

for handovers from the macro access node to the small access node, adjust a first handover initiation timer and a first signal level modifier based on the failure criteria, the determined first signal level, and the determined second signal level;

wherein the first signal level modifier adjusts a value of the first signal level of the macro access node for handovers from the small access node to the macro access node, adjust a second handover initiation timer and a second signal level modifier based on the failure criteria, the determined first signal levels, and the determined second signal levels;

wherein the second signal level modifier adjusts a value of the second signal level of the small access node perform one or more additional handovers using
  the adjusted first handover initiation timer and the adjusted first signal level modifier when the one or more additional handovers are from the macro access node to the small access node, or
  the adjusted second handover initiation timer and the adjusted second signal level modifier when the one or more additional handovers are from the small access node to the macro access node; and upon determining that a threshold failure level is met, suspend the adjusting of at the first and second handover initiation timer and the first and second signal level modifier.

12. The system of claim 11,
wherein the processing node is further configured to decrease at least one of the first handover initiation timer and the first signal level modifier when the failure criteria comprises loss of a communication link between the first wireless device and the macro access node.

13. The system of claim 11,
wherein the processing node is further configured to increase at least one of the first handover initiation timer and the first signal level modifier when the failure criteria comprises a failure to establish a communication link between the first wireless device and the small access node.

14. The system of claim 11,
wherein the processing node is further configured to increase at least one of the first handover initiation timer and the first signal level modifier when the failure criteria comprises completing the attempted handovers and performing the one or more additional handovers of the wireless device from the small access node to the macro access node within a predetermined period of time.

15. The system of claim 11,
wherein the processing node is further configured to:
provide the adjusted first or second handover initiation timer and the first or second signal level modifier to a second wireless device;
receive from the second wireless device a third signal level from the macro access node and a fourth signal level from the small access node; and
attempt to perform a second handover of the second wireless device from the macro access node to the small access node based on the adjusted second handover initiation timer and the second signal level modifier by the second wireless device.

16. The system of claim 15,
wherein the processing node is further configured to:
identify that the second handover of the second wireless device meets a second failure criteria; and
adjust further the adjusted second handover initiation timer and the second signal level modifier based on the second failure criteria, the detected third signal level, and the detected fourth signal level.

* * * * *